United States Patent [19]

Schäfer

[11] Patent Number: 4,731,794

[45] Date of Patent: Mar. 15, 1988

[54] OPTICAL LASER PUMPING SYSTEM

[75] Inventor: Fritz P. Schäfer, Göttingen-Nikolausberg, Fed. Rep. of Germany

[73] Assignee: Max-Planck-Gesellschaft zur Förderung der Wissenschaften e.V., Göttingen, Fed. Rep. of Germany

[21] Appl. No.: 868,091

[22] Filed: May 28, 1986

[30] Foreign Application Priority Data

Jun. 3, 1985 [DE] Fed. Rep. of Germany ....... 3519775

[51] Int. Cl.⁴ .............................................. H01S 3/091
[52] U.S. Cl. ....................................... 372/70; 372/66; 372/54
[58] Field of Search ......................... 372/69, 70, 66, 54

[56] References Cited

U.S. PATENT DOCUMENTS

| | | |
|---|---|---|
| 3,152,245 | 11/1964 | Litman . |
| 3,230,474 | 1/1966 | Keck . |
| 3,668,420 | 6/1972 | Vanderslice ............................ 372/3 |
| 3,675,156 | 6/1972 | Danielmeyer . |
| 3,911,375 | 10/1975 | DeMaria et al. ...................... 372/54 |
| 4,380,076 | 4/1983 | Bethume .............................. 372/72 |
| 4,397,023 | 8/1983 | Newman et al. ..................... 372/53 |
| 4,630,274 | 12/1986 | Schaefer ............................... 372/5 |

FOREIGN PATENT DOCUMENTS

| | | |
|---|---|---|
| 1293932 | 4/1969 | Fed. Rep. of Germany . |
| 1471267 | 1/1967 | France . |
| 419371 | 2/1967 | Switzerland . |
| 1481234 | 7/1977 | United Kingdom . |

OTHER PUBLICATIONS

Huth et al; "Tunable, Flashlamp-Pumped Organic Dye Laser"; IBM Tech. Discl. Bull.; p. 587, vol. 11, No. 6, Nov. 1968.
Johnson et al, "Plastic Q-Switch for Giant Pulse Lasers"; IBM Tech. Discl. Bull, vol. 15, No. 8, Jan. 1973.
Bethume; Dye Cells Design for High-Power Low-Divergence Excimer-Pumped Lasers", Applied Optics, vol. 20, No. 11, Jun. 1, 1981.
Wang et al; "A Simple, Efficient Plastic Dye Laser"; Optics Comm., vol. 18, No. 4, Sep. 1976.
Kirk; "High-Repetition Rate Plastic Dye Q-Switch"; IBM Tech. Discl. Bull., vol. 16, No. 6, Nov. 1973.

Primary Examiner—Leon Scott, Jr.
Attorney, Agent, or Firm—Frishauf, Holtz, Goodman & Woodward

[57] ABSTRACT

An optical laser pumping system comprises means for providing a highly collimated pump radiation beam propagating along an axis, and an optical element which forms a concave, frustro-conical reflecting surface which is coaxial to said axis and tapers in the direction of beam propagation from an entrance end of large cross section, into which said beam enters, to a distal end of small cross section which surrounds said axis in spaced relationship. The laser medium is positioned between said ends along said axis.

12 Claims, 4 Drawing Figures

OPTICAL LASER PUMPING SYSTEM

The present invention relates to lasers, more specifically to an optical system for irradiating in a highly uniform manner the circumferential surface of an essentially cylindrical space containing a laser medium.

BACKGROUND OF THE INVENTION

Generally, an optically pumped laser comprises an optical system which directs an exciting optical radiation ("pump radiation") into an active laser medium to produce the amount of population inversion necessary for laser action.

A known optical laser pumping system comprises a cylindrical reflector having an elliptical cross section. A flash lamp is positioned along a first focus line of the reflector to focus the radiation emitted by the flash lamp into an elongated laser medium positioned in the other focus line of the reflector.

A known optical dye laser pumping system comprises an excimer laser as pump radiation source and a cylindrical lens for focussing the pump radiation into a cuvette comprising a dye solution as active laser medium. Such a system is simple, however, it has the draw-back that the distribution of the excited (pumped) dye molecules is very uneven because the intensity of the pump radiation decreases, due to absorption, exponentially in the dye solution from a stripe-shaped irradiated surface region of the laser medium toward its opposite side. Thus, the amplification also tends to become uneven which causes a heavy distortion of the intensity distribution in the amplified laser beam. Further, the nonuniform excitation of the dye solution produces a gradient of the index-of-refraction of the solution, because the index-of-refraction of the dye solution decreases essentially proportional to the density of the excited dye molecules. This gradient tends to cause an undesired deflection of the laser beam and a distortion of its wave front. Increasing the depth of penetration of the pump radiation into the dye solution by decreasing the dye concentration of the solution is no acceptable remedy of the above problem, since it would cause a corresponding decrease of the efficiency of the pump radiation.

A known method which secures a uniform distribution of the pump radiation over the cross-section of the laser material is the so-called longitudinal pumping. Longitudinal pumping means that the pump radiation beam is propagated coaxially along the longitudinal axis of the laser medium which is generally of cylindrical shape. A laser beam to be amplified may be introduced into the laser medium along its axis by means of a dichroitic mirror which transmits the pump radiation essentially without damping and reflects the radiation to be amplified as completely as possible. It is known that an excellent beam quality can be obtained by longitudinal pumping, however, it is also known that the amplification obtainable is generally quite low.

An essential step forward was the system developed by D. S. Bethune (Appl. Opt. 20, 1897 (1981)). The Bethune system comprises a prism having a triangular cross-section with a rectangular edge and a longitudinal hole. The pump radiation beam enters through the hypotenuse surface and is reflected at the cathete surfaces. The laser material is positioned in the longitudinal hole and, thus, irradiated from four sides with the pump radiation so that a more uniform distribution of the excited dye moleculs resides. However, the inversion is still less near the axis of the active material than at the circumference thereof, if the laser medium is sufficiently concentrated to guaranty an effective absorption of the pump radiation. Thus, the Betune system suffers from an insufficient pump radiation efficiency and a strong decrease of the inversion from the circumference to the axis of the active laser medium as well as from an uneven angular distribution of the intensity on the circumference of the laser medium.

German patent application disclosure document No. 12,93,932 describes an optical laser pumping system which comprises a reflector in form of an elongated ellipsoid of revolution having a longitudinal axis and first and second focus points. A laser rod extends from the first focus point axially to the adjacent surface of the reflector and a gas discharge lamp is positioned between the other focus point and the adjacent surface of the reflector. The large size and manufacturing costs have prevented any significant practical use of this device.

Swiss patent No. 419,371, French patent No. 1,471,267, and U.S. Pat. No. 3,675,156 describe optically pumped laser systems employing an optical pump cavity including two facing, internally reflective frustro-conical elements in which an elongated laser medium and an elongated pump lamp are respectively axially oriented. The two conical elements may be connected by an internally-reflective cylindrical element. While these optical systems transfer most of the pump radiation emitted by the pump lamp on the elongated laser element, the distribution of the pump radiation on the circumferencial surface of the laser element is not very well defined, mainly because of the extended longitudinal and radial dimensions of the pump radiation source.

SUMMARY OF THE INVENTION

It is an object of the invention to provide an optical laser pumping system which produces a well-defined and extremely uniform radiation density on the circumferencial surface of an essentially cylindrical laser medium.

An embodiment of the invention comprises a reflector having a frustro-conical, reflecting surface surrounding an elongated cylindrical active laser medium, in combination with a pump radiation source which emits a highly collimated beam of pump radiation entering the larger diameter end of the reflector in axial direction.

The pump radiation source preferably comprises a laser. Alternatively, the pump radiation source may comprise a reflector having essentially the shape of a paraboloid-of-revolution, and a concentrated, i.e. essentially point-like incoherent radiation source, as an electrical gas discharge lamp.

BRIEF DESCRIPTION OF THE DRAWINGS

Further features and advantages of the invention will become apparent from the following detailed description taken together with the drawing, in which.

Figure 1:
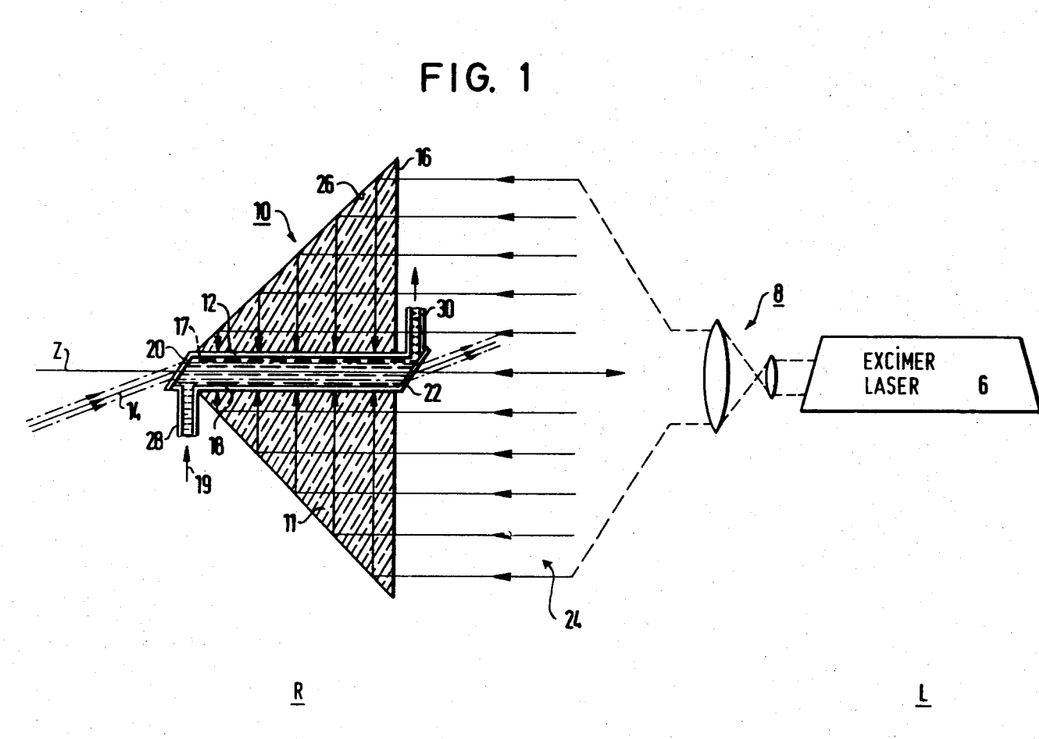
FIG. 1 is a simplified depiction of a preferred embodiment of the invention, partially in axial section.

The preferred embodiment of the invention shown in FIG. 1 comprises a light source portion L and a reflector portion R. The light-source portion L and the reflector portion R are not depicted in scale; The reflector portion R being drawn to a larger scale than the light source portion L for sake of clarity.

The light-source portion L comprises an excimer laser 6 and a beam-expander 8.

The reflector portion R is part of a dye laser amplifier 10. The reflector portion comprises a conical body 11 made of glass or quartz, which is axially symmetrical with respect to an axis Z and has an axial hole 12. The cylindrical hole 12 has a diameter which is slightly larger than the diameter of a coherent radiation beam 14 to be amplified ("signal beam"). The base angle of the conical body 11 is 45 degrees, the radius of the base surface 16 is $R_O$. A flow cuvette 18 is positioned within the hole 12 and dimensioned to fit closely into the hole 12. A dye solution 19, which constitutes the active laser medium of the laser amplifier is introduced into the cuvette 12 through an entrance conduit 28 and leaves the cuvette through an exit conduit 30. The ends of the cuvette 28 are closed by Brewster windows 20, 22.

In operation, the excimer laser 6 emits a coherent pump radiation beam which is expanded in diameter by a beam expander 8 to form an expanded beam 24, the diameter of which being essentially equal to the diameter of the base surface 16. The beam 24 impinges perpendicularly onto the surface 16, which is preferably provided with an antireflex coating (not shown), enters the glass cone 11 and is totally reflected at an optically polished conical surface 26 so that the radiation impinges strictly radially onto the cylindrical circumferential wall of the cuvette 18. The intensity of the pump radiation, which enters radially into the dye solution, decreases due to the absorption in the dye solution but simultaneously increases due to the focussing of the radiation onto the axis Z, the increase being inverse to the distance from the axis.

The intensity I as function of the normalized distance $r/r_O$ from the axis Z is $$I/I_{rO}=(r_O/r)[(\exp{(-ar_O(1-r/r_O))}+(\exp{(-ar_O(1+r/r_O))}] \qquad (1)$$

herein is $I_{rO}$ the intensity of the pump radiation on the inner circumferential surface of the cuvette;

$ar_O$ the extinction or optical density of the dye solution, $a=m_O s_a$, $m_O$ the concentration of the active centers in the ground state and $s_a$ the effective pump radiation absorption cross-section of the active centers, which are in the ground state.

The first sum term of equation (1) in the large parentheses is the contribution from an arbitrary predetermined direction, the second sum term is the contribution from the corresponding opposite direction. The situation is shown by the curves d to h of FIG. 2. It is obvious, that the intensity of the pump radiation in the cuvette and, thus, of the inversion density, increases up to a value $ar_O=1.5$ in the direction to the center. A small decrease is observed not before the curve h for $ar_O=2.0$, before the intensity raises again above the intensity at the circumference from $r/r_O=90.32$ on.

Figure 2:
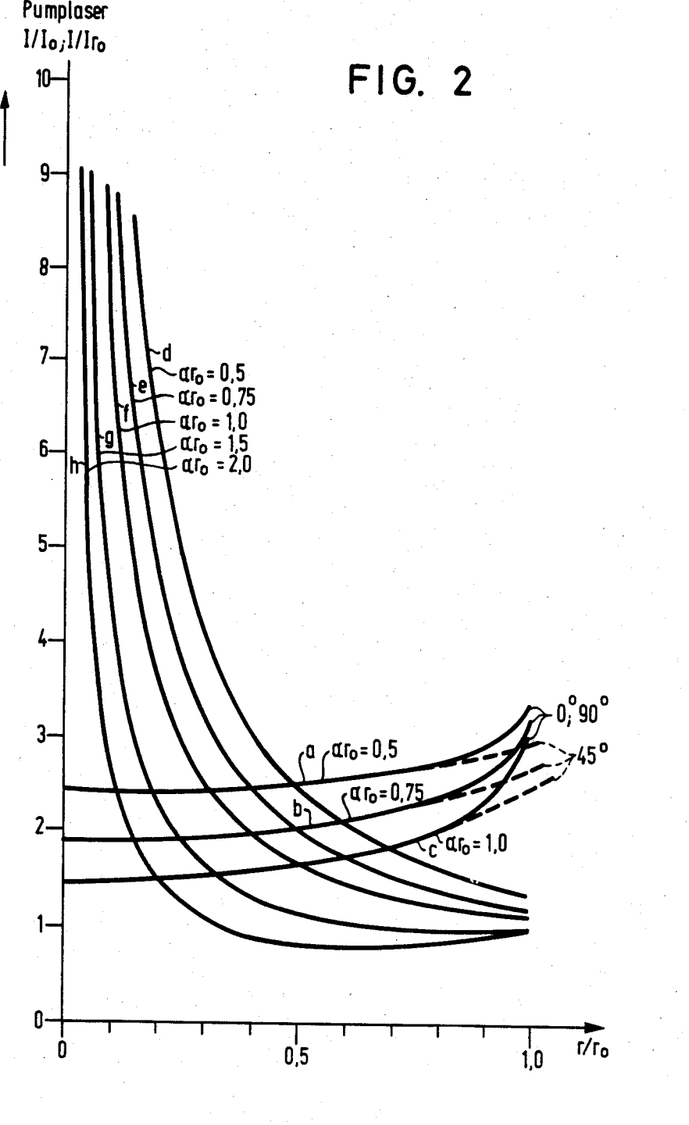
FIG. 2 is a diagram for explaining the distribution of the pump radiation intensity in a laser-active material positioned along the axis of the reflector shown in FIG. 1.

In contrast to the Bethune system it is immediately conceivable that a perfect rotational symmetry revails and that the intensity practically does not decrease towards the axis at least until the value $ar_O=1.5$, in contrast, the intensity has a pole on the axis. Of course, in practice the intensity will not become infinite on the axis since the value of the intensity on the axis is limited by the divergence of the pump radiation beam.

The combination of the conical system in combination with the highly collimated axial beam applied provides that each ray of the beam travels along a diameter of the cuvette, which is the path of maximum length in the dye solution. Thus, a most effective use of the pump radiation is obtained. The percentage of pump radiation absorbed for different optical density $ar_O$ is

| Optical Density: | 0,5 | 0,75 | 1,0 | 1,5 | 2,0 |
|---|---|---|---|---|---|
| Absorption (%): | 63 | 78 | 86 | 95 | 98 | with $ar_O=1.5$ only 5% of the pump radiation are not absorbed in the dye solution. A further important advantage of the invention is that the distribution of the density of the excited states across the beam cross-section is very desirable:

The distribution of the excitation across the cross-section, as it is obtained with the conical cell shown in FIG. 1, is in fact more preferred than an exactly uniform distribution over the cross-section. It is generally desired, that the intensity of the beam to be amplified is as closely as possible to the saturation intensity of the active medium, to make the most effective use of the excitation energy. The saturation intensity $I_s$ is defined as the condition, in which a photon with the energy hv impinges per absorption cross-section $s_e$ and pulse period $t_p$, i.e.:

$$I_s=h\cdot v/(s_e\cdot t_p).$$

Under these conditions, essentially all excited centers are transferred into the ground state by stimulated emission during the pulse period and transfer their energy to the signal beam to be amplified. This can be shown by the formula for the amplification V of a laser amplifier given by L. M. Frantz, and J.S. Nodvik (J. Appl. Phys. 34, 2346, (1963):

$$V=I_a/I_3=(I_s/I_e)\ln{[1+\exp{G_O(\exp{(I_e/I_s)}-1)}]} \qquad (2)$$

wherein $I_a$ is the output intensity of the amplifier, $I_e$ is the input intensity of the amplifier, $G_O=S_e\, m_a L$ is the small signal gain, and $m_a$ is the concentration of the excited centers.

If $I_e$ is small compared with $I_s$, the approximate formula $V_k=\exp{G_O}$ (small signal gain) results, and in the opposite case, $I_e$ large compared with $I_s$, the formula $$V_g=m_a L/(t_p\cdot I_e)+1$$

(large signal gain) results.

Since the input intensity of a beam to be amplified generally varies across the cross-section, i.e. according to a Gaussian intensity distribution, also the large signal gain across the cross-section will vary, if the distribution of the excited centers is uniform across the cross-section, i.e. with $m_a$=const. In this case, the lowest amplification is obtained, where the input signal has its highest intensity, i.e. on the optical axis of the input beam, while the slopes of the Gaussian intensity distribution are increasingly more amplified with increasing distance from the maximum on the axis. Thus, an intensity, which has a Gaussian distribution tends to be flattened to a uniform intensity distribution about the cross-section.

If, in contrast, if the concentration $m_a$ has a distribution across the cross-section which is similar to the intensity distribution of the signal beam to be amplified, it is immediately obvious from the above formula for the large-signal gain, that the amplification $V_G$ across the cross-section is essentially constant, since the ratio $m_a/I_e$ is essentially constant; thus, the intensity of the distribution of the signal beam to be amplified is not distorted along its path through the cuvette.

The height and the width of the intensity distribution of the pumping light in the dye solution can be varied within wide limits by not polishing the cuvette wall but fine grinding it or roughening it somewhat after polishing. Depending on the grain size of the used grinding or polishing material a more or less strong forward scattering of the pumping light is produced which controls the intensity on the axis and fills the slopes of the intensity distribution and, thus, produces a further approximation to a desired intensity distribution. The actual pattern of the intensity distribution may be determined e.g. by using low intensity pump light which excites only spontaneous fluorescence of the dye solution, taking a photographic picture of the cuvette's exit window illuminated by this fluorescence, and measuring the radial distribution of the optical density of the photographic picture with a densitometer, since the density of the photographic picture is essentially proportional (at least in the linear portion of the density characteristic of the film) to the intensity of the spontaneous fluorescence, and, thus, the intensity of the pump radiation.

A further important advantage of the optical pumping system according to the invention is the distribution of the intensity $I_{rO}$ along the axis. It is obvious, that a length $dz$ along the axis, which is near the apex of the cone, receives substantially less pump radiation than an equal length near the base of the cone, since in the first case, the pump light is received (reflected) from an area $dF_1 = 2\pi r_1 dr$ with a small base surface radius $r_1$, while in the second case, the pump radiation is received from an area $dF_2 = 2\pi r_2 dr$ with a large radius $r_2$. Thus, the distribution $I_{rO}(z)$ along the Z-axis is $$I_{rO}(z) = I_O \cdot z^2/(R_O \cdot r_O),$$

assuming that the Z coordinate has its origin in the apex of the cone and its positive direction extends in the direction to the base surface. Since, exactly speaking, the reflecting surface is a truncated cone rather than a full cone because the apex portion having the radius $r_O$ at its base surface is missing because of the axial hole, the exact formula is $$I_{rO}(z) = I_O (z^2 - r_O^2)/(R_O \cdot r_O).$$

Thus, the pump intensity and, thus, the excitation density increases from zero at the pointed end quadratically to a maximum value $$I_{rO}(R_O) = I_O (R_O/r_O - r_O/R_O).$$

If the laser medium in a cuvette pumped in this manner is used as amplifier in the large signal gain range, and using the above approximate formula for the large signal gain, a signal intensity $I(z)$ results after the signal beam has travelled a distance z along the axis in the cuvette:

$$I(z) = (\overline{m}_a \cdot z/(t_p \cdot I_e)) \cdot I_e.$$

Since a quadratically increasing distribution of $m_a$ is now assumed instead of the previously assumed constant distribution, the mean value $\overline{m}_a$ of the concentration of the active centers in the ground state has to be used instead of $m_a$:

$$\overline{m}_a = \frac{1}{z} \int_z^0 m_a(z)\, dz$$

Since $m_a$ is approximately $dI_{rO}(z)/dz$, $I_z = k_1 \cdot z^2 + I_e$ is obtained wherein $k_1$ is a constant comprising all constant factors involved. It is seen that the signal increases with the second power of the path length within the cuvette, thus, a rapid increase of the signal is obtained in contrast to the situation with a constant distribution.

The conduit 30 for the dye solution causes some shadowing of the pump light, and, thus, some loss of pump intensity which, however, can be made as small as desired by increasing the diameter of the conical body 11, while maintaining the diameter of the conduit 30 sufficiently small, since the area of the base surface 16 increases proportional to the second power of the diameter while the shadowed area is only proportional to the diameter of the conduit 30. Thus, the percentage of the shadowed area of the base surface of the cone is inverse to the ratio of the cone and conduit diameters.

Figure 3:
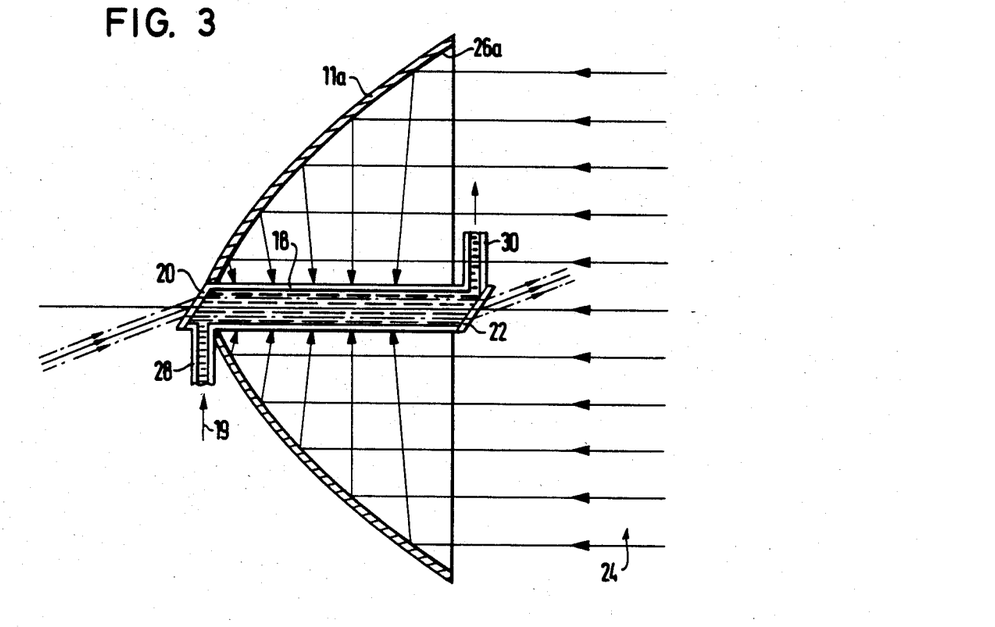
FIG. 3 is an axial section of a further embodiment of the invention.

It should also be appreciated that small deviations from the exact conical shape are possible. Further, a reflector in form of a hollow cone made of metal and having a specular, axially symmetrical inner surface may be used. The reflective surface, whether it is formed by the outer surface of a solid transparent body as shown in FIG. 1, or by the inner surface of a metal reflector, may be slightly curved as the surface 26a in FIG. 3, i.e. the tapering surface of revolution is generated by generatrices slightly concave towards the axis. The desirable properties of the present system are not materially altered by such modifications since they cause only a slight change of the longitudinal distribution of the pump radiation intensity $I_{rO}(z)$ in the cuvette, provided that a highly collimated pump radiation beam 24 is used. Thus, it is not necessary to manufacture the reflecting surface with close tolerances so that the manufacturing costs are reduced.

A very economical method of manufacture of the present optical system is to mold the conical body 11 and the cuvette 18 with its fluid connections as an integral body using a plastics material which is transparent for the pump radiation and inert against the solvent of the dye; e.g. polymethylemethacrylate is a suitable material for a dye laser comprising an aqueous solution of rhodamine 6G as active laser medium which is pumped with visible light radiation from a copper vapor laser.

The present optical system is also useful for pumping lasers comprising a solid or a gaseous laser medium, e.g. for pumping a ruby or neodymium glass laser with an excimer laser, or for pumping a $CF_4$-laser with a $CO_2$- laser, a conical body 11 made of NaCl or ZnSe being used in the latter case.

A further advantage of the present pumping system is that it is well suited for pumping lasers comprising an unstable resonator. Unstable resonators are often used in neodym neodymium and excimer lasers for producing a small beam divergence and a high efficiency. However, such resonators have the draw-back that the laser beam emitted has an annular intensity profile, wherein the "hole" in the center has a greater or lesser diameter depending on the type of the used resonator. This intensity distribution is entirely unsuitable for longitudinal pumping and much less suited for transversal pumping as the usually used radiation from a stable resonator. In combination with the present optical system, the diameter of the "hole" in the intensity distribution of the beam emitted from the unstable resonator can be made equal to the diameter of the dye cuvette by a simple optical telescope system, and the beam modified in this manner is then well suited for being radiated into the conical reflector system 10 in a loss-free and exactly rotational symmetrical manner. Thus, the optical pumping system according to the invention allows to make use the desirable properties of a laser comprising an unstable resonator with advantage for pumping an active laser medium.

Figure 4:
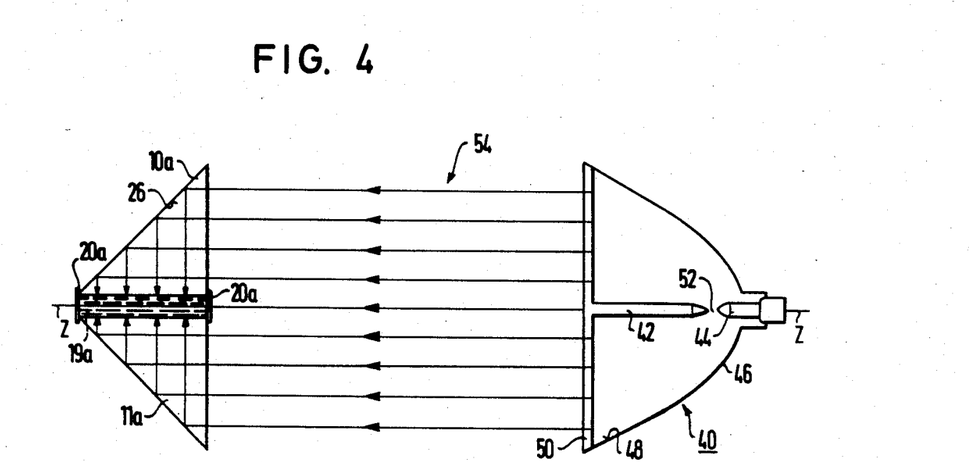
FIG. 4 is a simplified axial section of a laser oscillator comprising an optical system according to an embodiment of the invention including an electrical xenon arc lamp as pump radiation source.

As shown in FIG. 4, the optical system according to the invention is also useful for pumping an active laser medium 19a using a special type of electrical arc lamp. In the embodiment of FIG. 4 the system 10 comprises a laser oscillator, the active laser material 19a of which being positioned between a pair of mirrors 20a forming an optical resonator. The left-hand mirror is partially transparent for coupling out the laser radiation.

The arc lamp comprises a pair of electrodes 42, 44 spaced along the axis Z and positioned in a pressurized envelope 46 which is filled with a gas, as xenon, under pressure which may amount to several atmospheres. The tips of the electrodes are pointed and form a narrow gap 52 in which an electrical arc is formed in operation. The envelope 46 has an inner surface 48 which has the form of a paraboloid of revolution and is provided with a specular coating. The center of the short arc gap 52 coincides exactly with the focal point of the paraboloidic surface 48. The pressurized envelope has a front wall 50 made of a light-transparent material of high thermal and mechanical strength, as sapphire. The radiation which is emitted from the center of the arc gap 52 is collimated by the reflective surface 48 and emitted, parallel to the axis Z, through the window 50. Because of the finite length of the electric arc, the light beam 54 leaving the window 50 has an aperture angle which is about 6° to 12° for commercially available lamps of this type. The aperture angle is defined as the angle between the axis Z and the direction of a ray, at which the intensity of the far-field radiation has decreased to 1/10 of the intensity on the axis. Lamps of this type are available with an electrical power in the range of 150 watt to 800 watts. The window diameter varies between 25 mm to 48 mm.

If the system 10a of FIG. 4 is used in combination with the arc lamp 40, the conical body should be made of a material having such an index-of-refraction that a ray propagating with an angle w with respect to the axis Z is still totally reflected at the conical surface 26. A suitable material is Schott glass type SF6 which has an index-of-refraction $N_D=1.80518$. The limiting angle of the total reflection $u_G = \arcsin(1/n_D) = 33.64°$, thus a ray impinging with the angle $w = 45° - u_G = 11.36°$ is still totally reflected. For a wave length of 404.07 nm, w is 12.56°, for 706.5 nm w = 11.06°. Thus, the values of w obtainable with this type of glass are sufficient to gain about 90° of the input radiation and to concentrate it into the active laser material. Because of the finite aperture angle w, the pump radiation beam 54 is concentrated into a region of the active material with the approximate radius $r'_O = R_O w$ (w measured in radians). For an 800 watt lamp with $R_O = 24$ mm $$2r_{O'} = 24 \text{ mm } 10°/180° = 4.19 \text{ mm.}$$

A diameter of this magnitude is common in Nd/YAG-laser rods used for continuous laser operation. If other materials are used which are to be pumped in another spectral range, the glass may be replaced by another material which has a high index-of-refraction and is transparent in the respective spectral range, as sapphire or $CaF_2$. Alternatively, a hollow body having a reflecting conical inner surface may be used.

The conical shape may be approximated by a multi-face truncated pyramidal surface.

The invention has been described in connection with certain embodiments thereof. It is to be understood that further modifications may now suggest themselves to those skilled in the art and it is intended to cover such modifications as fall within the scope of the appended claims.

What is claimed is:

1. An optically pumped laser system comprising in combination
   a pump radiation source comprising a pump radiation laser for generating a pump radiation laser beam, said beam being highly collimated and propagating along an axis,
   a reflector comprising an essentially frustro-conical reflective surface positioned coaxially with respect to said axis and tapering in said propagation direction and located for impingement of said highly collimated beam directly thereon, and
   an active laser medium bounded by an essentially cylindrical, elongated circumferential surface, said laser medium being positioned on said axis and extending completely through the cone frustrum defined by said reflective surface, whereby said reflected collimated rays produce an intensity distribution of said pump radiation both radially and axially of said laser medium.

2. The system as claimed in claim 1, further comprising an elongated cylindrical flow cuvette enclosing said laser medium.

3. The system as claimed in claim 1 wherein said reflector comprises a solid body made of a material transparent to said pump radiation, said body having a smooth, frustro-conical surface forming said reflective surface, further a plane base surface positioned to receive said pump radiation beam and an axial hole for receiving said laser medium;
   said system further comprising an elongated, essentially cylindrical flow cuvette for receiving said laser medium,
   said body and said flow cuvette being integrally formed of plastics material.

4. The laser system as claimed in claim 1, wherein said reflective surface is a surface of revolution which tapers in the direction of the propagation of said pump radiation beam, said surface of rotation being formed by generatrices which are slightly concave or convese with respect to said axis.

5. The system as claimed in claim 1 wherein said pump radiation laser includes an unstable resonator and emits said pump radiation beam with an annular intensity profile.

6. A laser system comprising in combination
an excimer pump radiation source comprising a pump radiation laser for generating a pump radiation laser said pump radiation beam and an axial hole at its narrower end extending through said body coaxially therewith, and
an active laser medium defined by an essentially cylindrical, elongated circumferential surface positioned in said axial hole of said solid body of said reflector, fitting therein and extending substantially completely therethrough, for irradiation by the pump radiation reflected by said reflective surface so that the rays of the reflective radiation traverse the entire cylindrical surface of said laser medium which is surrounded by said solid body.

7. An optically pumped laser system comprising in combination:
a pump radiation source comprising a pump radiation laser for generating a pump radiation laser beam, said beam being highly collimated and propagated along an axis,
a reflector comprising a solid body made of a material transparent to said pump radiation, said body having a smooth, essentially frustoconical surface, providing an said pump radiation beam and an axial hole at its narrower end extending through said body coaxially therewith, and
an active laser medium defined by an essentially cylindrical, elongated circumferential surface positioned in said axial hole of said solid body of said reflector, fitting therein and extending substantially completely therethrough, for irradiation by the pump radiation reflected by said reflective surface so that the rays of the reflective radiation traverse the entire cylindrical surface of said laser medium which is surrounded by said solid body.

8. The system as claimed in claim 7 further comprising an elongated, cylindrical flow cuvette positioned in said axial hole, and enclosing said laser medium.

9. The system as claimed in claim 8, wherein said laser medium comprises a dye solution.

10. An optically pumped laser system as claimed in claim 7, wherein said reflective surface is a surface of revolution which tapers in the direction of the propagation of said pump radiation beam, said surface of rotation being formed by generatrices which are all slightly concave or all slightly convex with respect to said axis.

11. An optically pumped laser system as claimed in claim 7, wherein said pump radiation laser includes an unstable resonator and emits said pump radiation beam with an annular intensity profile.

12. A laser system comprising in combination:
a pump radiation source comprising a pump radiation laser for generating a pump radiation laser beam, said beam being high collimated and propagating along an axis,
a reflector comprising a solid body made of a material transparent to said pump radiation, said body having a smooth, essentially frustoconical surface, providing an essentially frustoconical reflective surface positioned coaxially with respect to said axis and tapering in said propagation direction for said pump radiation, said body further having a plane base surface position to receive said pump radiation beam and an axial hole at its narrower end extending through said body coaxially therewith, and
an active laser medium defined by an essentially cylindrical, elongated circumferential surface positioned in said axial hole of said solid body of said reflector, fitting therein and extending completely therethrough, for irradiation by the pump radiation reflected by said reflective surface so that the rays of the reflective radiation traverse the laser medium in diametral directions.

* * * * *

UNITED STATES PATENT AND TRADEMARK OFFICE
CERTIFICATE OF CORRECTION

PATENT NO.  : 4,731,794
DATED       : March 15, 1988
INVENTOR(S) : Fritz P. SCHAFER It is certified that error appears in the above-identified patent and that said Letters Patent is hereby corrected as shown below:

In Column 4, line 2  "= 90.32 on." should be -- = 0.32 on. -- line 4, "revails" should be -- prevails --.

line 50, "$I_a/I_3$" should be -- $I_a/I_e$ --.

In Column 7, line 6, "neodym" should be deleted.

In Column 9, Replace the text of claims 6 and 7 with the following:

6. A laser system comprising in combination an excimer pump radiation source comprising a pump radiation laser for generating a pump radiation laser beam, said beam being highly collimated and propagating along an axis,     a reflector comprising an essentially frustro-conical reflective surface positioned coaxially with respect to said axis and tapering in the direction of propagation of said pump radiation beam and located for impingement of said highly collimated beam directly thereon, and

UNITED STATES PATENT AND TRADEMARK OFFICE
CERTIFICATE OF CORRECTION

PATENT NO. : 4,731,794

DATED : March 15, 1988

INVENTOR(S) : Fritz P. SCHAFER

It is certified that error appears in the above-identified patent and that said Letters Patent is hereby corrected as shown below:

an active laser medium defined by an essentially cylindrical, elongated circumferential surface, said laser medium being positioned on said axis within said reflective surface so that the rays of the reflected radiation traverse the entire cylindrical surface of the laser medium which is surrounded by said reflective surface, said laser medium extending substantially completely through the cone frustrum essentially defined by said reflective surface.

7. An optically pumped laser system comprising in combination:

a pump radiation source comprising a pump radiation laser for generating a pump radiation laser beam, said beam being highly collimated and propagated along an axis,

UNITED STATES PATENT AND TRADEMARK OFFICE
CERTIFICATE OF CORRECTION

PATENT NO. : 4,731,794

DATED : March 15, 1988

INVENTOR(S) : Fritz P. SCHAFER

It is certified that error appears in the above-identified patent and that said Letters Patent is hereby corrected as shown below:

a reflector comprising a solid body made of a material transparent to said pump radiation, said body having a smooth, essentially frustoconical surface, providing an essentially frustoconical reflective surface positioned coaxially with respect to said axis and tapering in said propagation direction for said pump radiation, said body further having a plane base surface position to receive said pump radiation beam and an axial hole at its narrower end extending through said body coaxially therewith, and an active laser medium bounded by an essentially cylindrical, elongated circumferential surface positioned in said axial hole of said solid body of said reflector, fitting therein and extending substantially completely therethrough whereby the entire cylindrical surface of said laser medium which is within said solid body is pumped.

UNITED STATES PATENT AND TRADEMARK OFFICE
CERTIFICATE OF CORRECTION

PATENT NO. : 4,731,794
DATED : March 15, 1988
INVENTOR(S) : Fritz P. SCHAFER

It is certified that error appears in the above-identified patent and that said Letters Patent is hereby corrected as shown below:

In Column 10, Claim 12, line 19, delete "a" (first occurrence) and insert -- an excimer --;

line 21, delete "high" and insert -- highly --;

line 37, after "extending" insert -- substantially --;

line 40, after "traverse the" insert -- entire cylindrical surface of said --;

line 41, delete "in diametral directions" and insert -- which is surrounded by said solid body --.

Signed and Sealed this

Fourth Day of September, 1990

Attest:

HARRY F. MANBECK, JR.

*Attesting Officer*      *Commissioner of Patents and Trademarks*